Oct. 13, 1959 SERGI M. FOMENKO 2,908,541

MAGNETIC RECORDING APPARATUS

Filed Sept. 19, 1955

INVENTOR.
SERGEI M. FOMENKO
BY Seymour Scholnick
ATTORNEY

United States Patent Office 2,908,541

Patented Oct. 13, 1959

2,908,541

MAGNETIC RECORDING APPARATUS

Sergei M. Fomenko, Los Angeles, Calif., assignor, by mesne assignments, to Litton Industries, Inc., Beverly Hills, Calif., a corporation of Delaware

Application September 19, 1955, Serial No. 534,922

9 Claims. (Cl. 346—74)

The present invention relates to magnetic recording apparatus for recording on a moving media and more particularly to a magnetic recording apparatus wherein maintenance of a fixed spacing between two relatively rotatable members each having a plane surface is almost totally dependent upon the flatness of the plane surfaces and upon the sphericities of a plurality of balls positioned between the surfaces and is relatively independent of other mechanical tolerances in the apparatus.

In playback of a recorded signal from a recording surface established on a rotating disk or drum, the prior art has employed either a "contact" method in which an associated transducer is in engagement with the recording surface, or a "non-contact" method in which the transducer is spaced from the surface. In both "contact" and "non-contact" recording in the prior art major difficulties have been occasioned by eccentric rotation or wobble ("run-out") of the record surfaces as they rotate past the magnetic transducer.

For example in "contact" recording, in which the transducer is pressed against the recording surface, as with a spring, it is obviously desirable to utilize as light a spring force as possible to minimize injury to the record surface and the transducer caused by their rubbing engagement. However, eccentric rotation or wobble of the record surface causes the transducer to be cyclically accelerated away from the record surface, this acceleration being proportional to the amplitude of the drum eccentricity or disk wobble. To counteract this acceleration and thereby keep the transducer constantly pressed in contact against the recording surface, a relatively heavy spring would be required. In practice because of the large amount of "run-out" found in prior art magnetic recording apparatus, it is difficult to reconcile the above described conflicting requirements with respect to the force exerted by the spring. Therefore, in the prior art, little use has been made of "contact" recording.

Eccentricity and wobble of record surfaces also causes severe difficulties in connection with non-contact recording on the surfaces. It is quite clear that if a magnetic record surface could be made to run perfectly true without any run-out or eccentricity in operation, then a magnetic transducer could be positioned very nearly as close to the drum surface as desired, the spacing between transducer and drum then being limited only by the expected wear of the drum bearings and by possible differential thermal expansion between the drum and the structure which supports the transducer adjacent the drum. However, if any eccentricity or "run-out" of the drum does exist, then the transducer must be spaced further from the surface both to avoid destructive contact with the high point of the eccentric drum and to reduce the severity of cyclic amplitude modulation of the transducer output signal caused by corresponding cyclic variation in gap spacing as the eccentric drum rotates beneath the transducer. Extreme amplitude modulation of the transducer output signal is undesirable because it necessitates greatly increased complexity in amplifier circuits associated with the transducer.

For the above described reasons, in prior art drum recording great efforts are made to reduce drum eccentricity. Eccentricities as low as .0005 inch to .00025 inch are regularly obtained and even lower eccentricities may be obtained if close enough mechanical tolerances are held. However, it will be understood that in the prior art such reduction of drum eccentricity has only been attained by maintaining extremely close mechanical tolerances for a number of critical dimensions in the construction of a drum recording apparatus. To understand the necessity for such critical dimensions, consider the structural arrangement of a conventional prior art magnetic drum apparatus.

In such a conventional drum recording apparatus, the drum is fitted or mounted on a central spindle which in turn is rotatably mounted in bearings positioned in a housing. A transducer mounted on the housing is positioned adjacent the drum surface for recording upon and playback from the surface. To maintain constant spacing between transducer and drum surface in such a device each of the following conditions must be satisfied. First, the spindle must run absolutely true with respect to the housing, a condition which can only be satisfied through use of a precision spindle, the highest precision bearings, and accurately ground and finished bearing seats in the housing. Second, the drum must be mounted upon the spindle with negligible tolerance or play between it and the spindle, this second condition being satisfied by providing the drum with a very accurate central bore whose internal diameter is essentially a zero tolerance fit to the outer diameter of the spindle. Finally, the outer periphery or surface of the drum must be everywhere concentric with respect to the bore of the drum, a condition usually satisfied by very accurate machining and finishing of the drum surfaces.

In this manner the basic problem of drum design, which is to have the drum surfaces concentric with the axis of rotation of the spindle, is multiplied into three separate problems, namely: maintenance of concentricity between the axis of rotation of the spindle and the spindle surface; maintenance of concentricity and essentially zero tolerance between the spindle surface and the central bore of the drum; and maintenance of concentricity between the drum bore and the drum periphery. Deviations from true concentricity at any of these three steps may be additive in producing overall eccentricity of drum rotation. It is therefore clear that a prior art magnetic drum apparatus is necessarily a high precision device, quite expensive to produce and not easily produced in quantity by assembly line methods. Moreover such an apparatus is easily perturbed or injured by extremes of heat or cold which tend to produce differential expansion between parts of the apparatus.

A somewhat similar situation prevails with respect to a prior art magnetic disk recording apparatus in which a magnetic transducer is positioned adjacent a plane surface of a disk fixedly mounted on a rotatable spindle. If the surface plane of the disk departs even slightly from a perpendicular relationship to the axis of rotation of the spindle, the disk surface will "wobble" cyclically as it rotates causing a corresponding cyclic variation in spacing between the surface and the transducer. In the prior art, to reduce disk "Wobble" great efforts are made to finish the disk so that its plane surface is exactly perpendicular to a central bore established in the disk, this central bore being closely controlled in diameter so as to fit snugly with essentially zero tolerance over the spindle on which the disk is mounted. The spindle in turn is carefully positioned within a housing by precision bearings so that in rotation, its surface is concentric with its axis of rotation.

Thus in a prior art magnetic disk recording apparatus, as in a drum recording apparatus, the basic alignment problem (maintaining the disk surface perpendicular to the spindle axis of rotation) is multiplied into three separate problems namely: maintenance of concentricity between the spindle surface and its axis of rotation; maintenance of concentricity and essentially zero tolerance between the spindle surface and the central bore of the disk; and maintenance of a perpendicular relationship between the recording surface of the disk and the central bore of the disk. Even slight deviation from these conditions will cause severe disk wobble in a prior art disk recording apparatus.

In contrast to prior art magnetic recording apparatus, the present invention provides a magnetic recording apparatus wherein maintenance of a fixed unvarying spacing between two relatively rotatable members is almost entirely dependent upon the flatness of plane surfaces established upon the members and upon the sphericity of a plurality of balls positioned between the surfaces and is relatively independent of other mechanical tolerances in the apparatus.

A recording apparatus mechanized according to the present invention is in one respect similar to a prior art magnetic disk recording apparatus in that recording and playback are usually effected on a plane surface established on one of the members, the recording surface being preferably an extension of the plane surface which is contacted by the interpositioned balls. Moreover either of the relatively rotatable members may be coupled for rotation to a central spindle or drive shaft.

However, in contrast to a prior art disk recording apparatus, in a recording apparatus according to the present invention, it is not necessary that the magnetizable recording surface be exactly perpendicular to the axis of rotation of the spindle. Moreover a close fit between such a driven member and an associated driving spindle is not required. In several embodiments of the invention a relatively loose fit between a driven member and an associated spindle is, in fact, a preferred feature of the invention. In addition exact concentricity between the spindle surface and its axis of rotation is not essential to operation. Considerable departures from concentricity may be readily tolerated.

According to the basic concept of the present invention a fixed spacing is maintained between two relatively rotatable members, each having a plane surface by spacing the members from each other with a plurality of equidiametered spherical balls positioned between the surfaces. The two relatively rotatable sections of the recording apparatus are loaded toward each other so as to tend to compress the balls between the plane surfaces. In addition, at least one of the members is initially relatively freely alignable in its plane of rotation so that when its plane surface is loaded against the balls, the member is constrained to then align itself so that its plane surface is in contact with each of the balls and is therefore parallel to the plane surface of the other member. In this manner a constant spacing is maintained between the two plane surfaces equal to the common diameter of the interpositioned balls. The balls thus act as spacers between the two plane surfaces and also serve as bearings to allow relative rotation of the two members. A transducer is fixedly positioned relative to one of the members for recording and playback upon a recording surface established upon the other member, the recording surface being preferably a portion of the plane surface established upon the member.

In a preferred embodiment of the invention, one of the relatively rotatable members, that member to which the transducer is affixed, is normally stationary (therefore being designated as the stator) and is permanently mounted on the face of an electric motor. The motor shaft protrudes through a central orifice provided in the stator, the shaft being roughly perpendicular to the plane surface of the stator. The plane surface of the stator is annularly disposed with respect to the central orifice of the stator. Three spherical, equidiametered balls are positioned in contact with the plane surface of the stator, these bearings being held in a plastic bearing cage which is fitted loosely over the motor shaft. The second relatively rotatable member, designated "the rotor" is loosely fitted over the motor shaft, the clearance between the rotor and the shaft being great enough to permit free angular alignment of the rotor with respect to the shaft. By means of a shaft preload nut and an intervening spring washer the rotor is resiliently loaded toward the stator so as to compress the balls between the plane surfaces of the stator and the rotor. In this manner the rotor is constrained to an angular position at which its plane surface is in perfect parallel alignment with the plane surface of the rotor, the spacing between the plane surfaces being determined only by the flatness of the opposing plane surfaces and the sphericity of the intervening balls.

In operation when the motor shaft is rotated, the spring washer, which is pressed by the shaft preload nut against the rotor to resiliently load the rotor toward the stator, also acts as a frictional coupling between the shaft and the rotor, thereby compelling the rotor to rotate with the shaft. Since the rotor remains loaded toward the stator, the intervening balls continue to act as spacers although at the same time they are functioning as ball bearings which permit smooth rotation of the rotor with respect to the stator. In operation total variation in spacing between the plane surfaces remains of the same order as the sum of the tolerances in ball sphericity and surface flatness. Since each of the plane surfaces may be readily lapped flat to about 10 millionths of an inch and since balls are commercially available with sphericities also of 10 millionths of an inch, total run-out or variation in spacing of about 30 millionths of an inch is readily obtainable and even higher accuracies are possible if desired.

Moreover in the described embodiment of the invention, if the rotor is provided as a reasonably symmetrical structure no attention need be paid either to radial positioning or dynamic balancing of the rotor disk since in operation the symmetrical rotor will tend to be both self-centering and self-balancing. It is well known that an unconstrained body will rotate only about its own center of gravity, and that if such a body is constrained to rotate about any other point large vibratory unbalanced forces will be developed which tend if unopposed to return the body to rotation about its center of gravity. Thus in the preferred embodiment of the present invention, if initially the center of gravity of the rotor does not correspond to the axis of rotation of the motor shaft, large radial restoring forces are developed.

These radial restoring forces, happily, are relatively unopposed; since the spring washer in contact with the rotor affords only slight frictional resistance to radial motion of the rotor, while the balls which are also in contact with the rotor cannot exert any radial forces on the rotor disk. In this manner a symmetrical rotor becomes in operation dynamically self-balanced with its center of gravity corresponding to the axis of rotation of the driving motor shaft. For a symmetrical rotor the center of gravity corresponds to the geometric center of the rotor and therefore the rotor is simultaneously self-centering as well as self-balancing.

Although this use of radial clearance between rotor and shaft is a preferred feature of one embodiment of the invention, it is not an essential characteristic of the invention since excellent results have been obtained without the use of this feature. For example, in one embodiment of the invention, the rotor was very closely fitted to the motor shaft so that neither angular alignment or radial motion of the rotor relative to the shaft was possible. However, the fit between shaft and rotor was smooth enough to permit the rotor to be axially spring loaded against the balls. In addition the motor shaft was alignably mounted in its housing with a single selfaligning bearing which acted like a ball joint to permit a swiveling motion of the shaft with respect to its housing. Thus in this embodiment of the invention, when the rotor was loaded against the balls, rotor and shaft would swivel together, as a unit, until such time as the plane surface of the rotor was aligned in a true parallel relationship to the plane surface of the stator.

In another embodiment of the invention which is described in specific detail in the present application, the rotor is resiliently connected to the shaft by means of a flexible diaphragm or other spring coupling. In this embodiment of the invention, free alignment of the rotor is obtained by means of the flexible coupling rather than through use of clearance between rotor and shaft. Excellent results are obtainable with this structure.

It is therefore clear that in the basic aspects of the invention it is only necessary that one or both of the rotatable members be relatively freely alignable with respect to the other so that a parallel relationship between the members is determined geometrically by the opposing plane surfaces and the intervening balls without disturbance by other mechanical constraints. Those skilled in the mechanical arts will readily perceive other structures for providing the required alignability.

It is therefore an object of the present invention to provide a magnetic recording apparatus wherein a fixed spacing between two relatively rotatable members is established by a plurality of spherical equidiametered balls compressed between the two members.

It is another object of the present invention to provide a magnetic recording apparatus wherein a fixed spacing is maintained between two relatively rotatable members each having a plane surface by spacing the members from each other with a plurality of equidiametered spherical balls positioned between said plane surfaces, each ball being in contact with both of said surfaces.

It is still another object of the invention to provide a magnetic recording apparatus wherein an initially freely alignable rotor disk having a magnetizable record channel established thereon is aligned in its plane of rotation by being resiliently loaded against a plurality of equidiametered spherical balls positioned between a plane surface of the disk and a plane surface of a stator on which a magnetic transducer is mounted.

It is yet another object of the invention to provide a magnetic recording apparatus wherein a radially self-balancing rotor disk is aligned in its plane of rotation by being resiliently loaded against a plurality of equidiametered spherical balls positioned between a plane surface of the rotor disk and a plane surface of a stator, the balls thereby being compressed between the two plane surfaces whereby the plane surface of the disk is constrained to true parallel alignment with the plane surface of the stator with a fixed spacing therebetween corresponding to the diameter of the balls.

It is a further object of the present invention to provide a magnetic recording apparatus wherein a fixed spacing is maintained between two relatively rotatable members each having a plane surface by spacing the members from each other with a plurality of equidiametered spherical balls positioned between the plane surfaces, each ball in contact with both of said surfaces, a magnetizable record channel being established on one of said surfaces and a magnetic transducer being fixedly positioned relative to the other of said surfaces for reading information recorded on the record channel.

It is still a further object of the invention to provide in a magnetic recording apparatus a rotor disk resiliently coupled to a rotatable shaft and freely alignable in its plane of rotation with respect to the shaft, the rotor disk being aligned in its plane of rotation by being loaded against a plurality of equidiametered spherical balls positioned between a plane surface of the rotor disk and a plane surface of a stator thereby constraining the rotor surface to true parallel alignment with the stator surface at a spacing therefrom equal to the ball diameter.

It is yet a further object of the present invention to provide a magnetic recording apparatus wherein a fixed spacing is maintained between two relatively rotatable members each having a plane surface by spacing the members from each other with a plurality of equidiametered spherical balls positioned between said plane surfaces, one of said members being resiliently loaded toward the other member to compress or preload the balls between said plane surfaces thereby constraining said plane surfaces to parallel alignment at a spacing equal to the common diameter of said balls.

The novel features which are believed to be characteristic of the invention both as to its organization and method of operation, together with further objects and advantages thereof will be better understood from the following description considered in connection with the accompanying drawing in which several preferred embodiments of the invention are illustrated by way of example. It is to be expressly understood however that the drawings are for the purpose of illustration and description only and are not intended as a definition of the limits of the invention.

Figure 1:
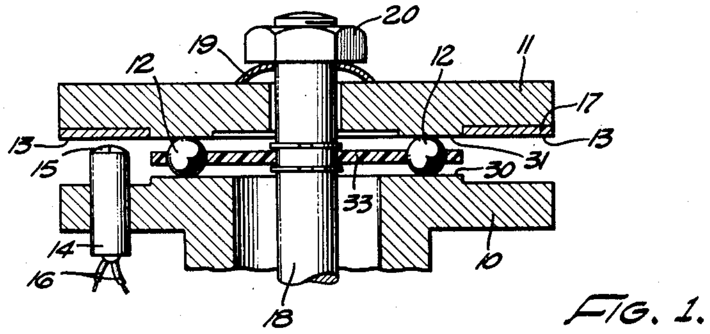
Fig. 1 is a side elevation partly in section of one form of magnetic recording apparatus according to the present invention.

Referring now to the drawings there is shown in Fig. 1 a preferred embodiment of a magnetic recording apparatus according to the present invention in which a fixed spacing is maintained between rotatable members 10 and 11 each having a plane surface, surfaces 30 and 31 respectively, by means of a plurality of equidiametered spherical balls 12 positioned between the surfaces, members 10 and 11 and balls 12 constituting, in effect, a thrust bearing. As shown in Fig. 1 one of said members, member 11 has a magnetizable recording surface 13 established thereon which is coparallel with and preferably substantially coplanar with plane surface 31. The other of said members, member 10, has a magnetic transducer 14 affixed thereto, transducer 14 being so positioned that an active portion 15 thereof is contiguous to magnetizable surface 13. Upon rotation of section 11 with respect to section 10, information signals magnetically stored on magnetizable surface 13 are rapidly transported past transducer 14 by reason of the rotation of section 10 with respect to section 11, transducer 14 responding to these magnetically stored information signals by producing and applying corresponding electrical signals to a pair of associated output conductors 16.

Magnetizable recording surface 13 is shown in Fig. 1 as a very thin coating of magnetic material evenly established upon an outer portion of plane surface 31, peripheral with respect to balls 12, this portion of plane surface 31 being composed of non-magnetic material to serve as a suitable non-magnetic base for magnetizable recording surface 13. The more central portions of plane surface 31, which, it will be shown, effectively serve as bearing races, are preferably composed of steel or other suitably hard and durable material. The non-magnetic portion of plane surface 31 may be provided for example, as shown in Fig. 1, by a plated insert 17 of chromium which, in the preparation of plane surface 31, may be finished flat (by lapping or other processes) simultaneous with the finishing of other portions of surface 31. Many other methods may also be used to provide a magnetizable recording surface which is coparallel with plane surface 31. For example good results may be obtained by providing insert 17 as a body of suitably magnetizable material such as nickel-cobalt having great enough depth so that the characteristics of the recording surface thereby established at the surface of insert 17 are largely controlled by the magnetic characteristics of the nickel-cobalt and are relatively independent of the magnetic characteristics of the material in which insert 17 is embedded.

Figure 3:
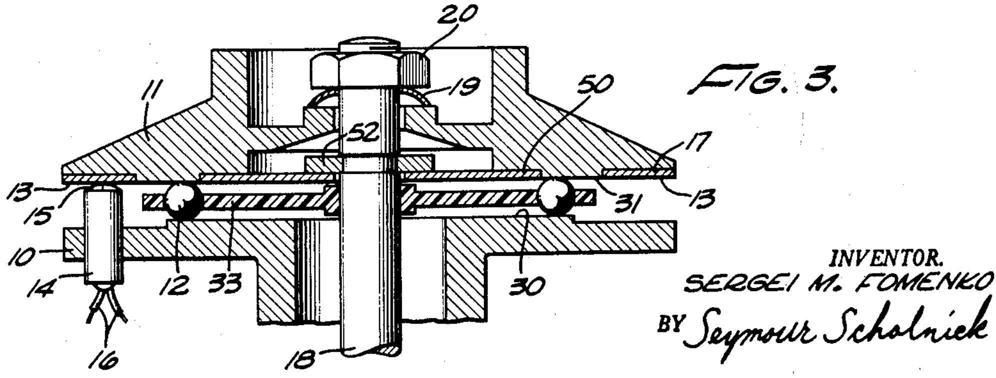
Fig. 3 is a side elevation, partly in section of still another form of a magnetic recording apparatus according to the present invention.

In the preferred embodiment of the invention shown in Fig. 1, means for rotating section 11 with respect to section 10 is provided by frictionally coupling section 11 to a rotatable shaft 18 which, it will be understood, is in this embodiment of the invention, relatively fixedly positioned axially and radially with respect to section 10, but is otherwise free for rotation with respect to section 10. For example, shaft 18 may be positioned relative to section 10 by a ball bearing or in certain highly preferred embodiments of the invention hereinbelow described by a pair of ball bearings. Frictional coupling of section 11 to shaft 18 is accomplished by means of a spring washer 19 which as shown in Fig. 3 is loaded against section 11 by a nut 20 threaded onto the end of shaft 18.

Since shaft 18 is fixedly positioned in its axial direction with respect to section 10, the effect of threading nut 20 upon shaft 18 is to pull section 11 towards section 10 thereby tending to compress or preload balls 12 between sections 10 and 11. As shown in Fig. 1, section 11 is in the form of an annular disk having a central orifice of slightly greater diameter than shaft 18, section 11 being fitted over shaft 18 with a small clearance, on the order of .005 of an inch so that section 11 (hereinafter designated as disk 11) is freely alignable in its plane of rotation. Since that portion of the surface of section 10 which is in contact with balls 12 is a portion of plane surface 30 while that portion of the surface of section 11 which is in contact with balls 12 is a portion of plane surface 31, it is clear that the described loading of disk 11 towards section 10 has the effect of constraining disk 11 to align itself so that plane surface 31 of disk 11 is parallel to plane surface 30 of section 10 and spaced therefrom at a fixed spacing corresponding to the diameter of balls 12. It is seen, moreover that this parallel alignment of surfaces 30 and 31 is independent of mechanical tolerances in the coupling between disk 11 and shaft 18 and is moreover relatively independent of the angular alignment of shaft 18 with respect to section 10. It is evident that the trueness of the parallel alignment of surfaces 30 and 31 is critically dependent only upon true flatness of plane surfaces 30 and 31 and upon true sphericity of the equidiametered balls 12.

Fortunately each of these critical parameters, the flatness of surfaces 30 and 31 and the sphericity of the equidiametered balls 12, may be readily controlled to a high degree of precision. For example, through use of well known commercial lapping processes, surfaces 30 and 31 may be easily finished to a surface flatness of better than ten millionths of an inch while spherical steel balls of almost any desired diameter are commercially available with sphericities of ten millionths of an inch. It would be expected therefore that in operation, in the immediate neighborhood of balls 12, the spacing between surfaces 30 and 31 would remain substantially constant varying in operation only in a narrow range established by the tolerances in ball sphericity and surface flatness. This expectation is indeed correct. In an embodiment of the invention in which the tolerance in ball sphericity is 10 millionths of an inch and the tolerance in surface flatness of surfaces 30 and 31 is 10 millionths of an inch the maximum variation in spacing between surfaces 30 and 31 in the neighborhood of balls 12 is of the order of 30 millionths of an inch (the total variation being approximately equal to the sum of the tolerances in the balls and the two plane surfaces).

Since magnetizable recording surface 13 is parallel with plane surface 31 and is in effect a portion of or extension of plane surface 31 it is clear that a similar constancy of spacing must exist between magnetizable recording surface 13 and surface 30. As a result of this constancy of spacing, it is possible to position transducer 14 extremely close to magnetizable surface 13 and thereby obtain greatly increased signal playback amplitude without danger of destructive intermittent contact between the transducer and the recording surface. Moreover with relatively light spring loading of the transducer, it is possible to obtain excellent results with contact engagement between the transducer and recording surface.

Figure 2:
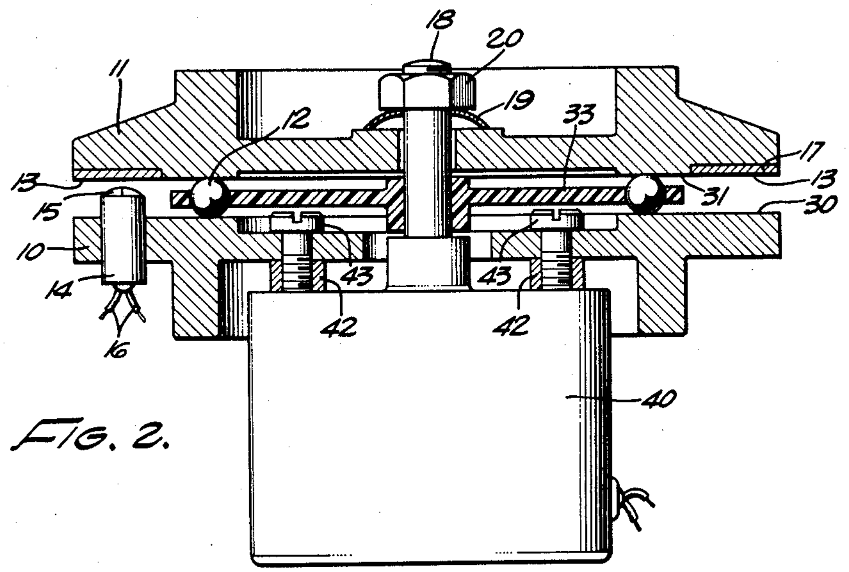
Fig. 2 is a side elevation, partly in section of a modified form of the magnetic recording apparatus shown in Fig. 1 as adapted for mounting upon an electric motor.

Referring next to Fig. 2, there is shown an embodiment of the invention, corresponding generally to that embodiment of the invention shown in Fig. 1, in which rotatable shaft 18 is provided as the output shaft of an electric motor 40 which is operable for rotating member 11 (now designated as the rotor) with respect to member 10. As illustrated in Fig. 2, member 10 is normally stationary (therefore being designated as the stator) and is permanently mounted on the face of electric motor 40 by means of spacers 42 and screws 43 which pass through holes in member 10 and in spacers 42 to thread into mating mounting holes, not shown, in the face of motor 40. The heights of spacers 42 are dimensioned so that member 10 is positioned with its plane surface 30 roughly perpendicular to axis of rotation of shaft 18.

However, as in the embodiment of the invention shown in Fig. 1, exact perpendicularity of shaft 18 with respect to plane surface 30 is not required because any departures from perpendicularity are compensated for by the free alignability of rotor 11 in its plane of rotation, this required alignability being provided by a looose fit between rotor 11 and shaft 18. The clearance between rotor 11 and shaft 18 is great enough to permit free angular alignment of the rotor with respect to shaft 18. By means of shaft preload nut 20 and the intervening spring washer 19, rotor 11 is resiliently loaded toward stator 10 so as to compress balls 12 between the plane surfaces 30 and 31, respectively, of the stator and rotor. In this manner rotor 11 is constrained to an angular position at which its plane surface 31 is in perfect parallel alignment with plane surface 30 of stator 10, the spacing between the plane surfaces being determined only by the flatness of the opposing plane surfaces and the sphericities of the intervening balls.

In operation when motor 40 is energized to rotate shaft 18, spring washer 19 which normally serves as a preload element to resiliently load rotor 11 towards stator 10, also serves as a frictional coupling between shaft 18 and rotor 10, thereby compelling rotor 10 to rotate with shaft 18. Since, in this operation, rotor 11 remains loaded toward stator 10, the intervening balls 12 continue to act as spacers although at the same time they are functioning as ball bearings which permit smooth rotation of rotor 11 with respect to stator 10. Thus even with relatively high speed operation of the magnetic recording apparatus shown in Fig. 2, total run-out or variation in spacing between rotor 11 and stator 10 remains at extremely low values determined almost entirely by the flatness of plane surfaces 30 and 31 and the sphericities of balls 12. As stated hereinbefore total run-out in operation of 30 millionths of an inch or less is readily obtainable, a tolerance which represents an improvement by at least an order of magnitude over the tolerances obtained in the best prior art devices.

Moreover, in the embodiment of the invention shown in Fig. 2 because of the clearance provided between rotor 11 and shaft 18, no attention need be paid either to radial positioning or dynamic balancing of rotor 11, since in operation, the symmetrical rotor shown in Fig. 2 will tend to be both self-centering and self-balancing. It is well known that an unconstrained body will rotate only about its center of gravity, and that if such a body is constrained to rotate about any other point, large vibratory unbalanced forces will be developed which tend, if unopposed, to return the body to rotation about its center of gravity.

Thus in the embodiment of the invention shown in Fig. 2, if initially the center of gravity of rotor 11 does not correspond to the axis of rotation of motor shaft 18, large radial restoring forces are developed which tend to slide the rotor, in its plane of rotation, until the center of gravity of rotor 11 does substantially coincide with the axis of rotation of shaft 18. The clearance provided between rotor 11 and shaft 18 removes a constraint which would otherwise prevent this sliding or shifting of rotor 11 relative to shaft 18 which is required for its self-balancing adjustment. Other possible opposition to this radial adjustment of rotor position is kept at a minimum. Spring washer 19 for example affords only slight frictional resistance to radical motion of rotor 11, while balls 12, which are also in contact with rotor 11, obviously cannot exert any radial forces on the rotor.

As a result of these factors, rotor 11 is in operation dynamically self-balancing with its center of gravity corresponding to the axis of rotation of the driving motor shaft. Moreover since rotor 11 is a symmetrical body as shown in Fig. 2, its center of gravity corresponds to its geometric center and therefore the rotor is simultaneously self-centering as well as self-balancing.

Although the use of radial clearance between rotor 11 and shaft 18 is a preferred feature of the embodiment of the invention shown in Fig. 2, it will be understood that other means may also be utilized to provide free alignment of the plane of rotation of at least one of the relatively rotatable members with respect to the other. For example there is shown in Fig. 3 an embodiment of the invention in which rotor 11 is directly connected to shaft 18 by means of a thin metal diaphragm 50 whose outer periphery is brazed to rotor 11 and whose inner diameter is brazed to a ring insert 52 which is connected to shaft 18. Diaphragm 50 exhibits great resistance to pure radial motion of rotor 11, but is relatively easily bent or flexed in other directions. Thus diaphragm 50 serves both as a flexible coupling between shaft 18 and rotor 11 and also serves as a device for fixedly locating the radial position of rotor 11. In the embodiment of the invention shown in Fig. 3, free alignment of rotor 11 with respect to stator 10 is obtained by means of the flexible coupling provided by diaphragm 50 rather than through use of clearance between rotor 11 and shaft 18.

Although the magnetic recording apparatus shown in Fig. 3 lacks the self-balancing feature found in the hereinbefore described embodiments of the invention, it does have an advantage in that diaphragm 50 exhibits great resistance to undesired radial displacement of rotor 11 which might otherwise be occasioned for example by abrupt accelerations encountered in a moving vehicle. On the other hand a self-balancing rotor such as that shown in Fig. 2 develops in operation large enough restoring forces so that it too exhibits moderate resistance to undesired radial displacement. Thus a choice between the two described methods of mounting and positioning rotor 11 with the desired alignability resolves to a consideration of the nature and magnitude of the accelerations which will be encountered by the recording apparatus.

It is therefore clear that in the basic aspects of the invention, the important consideration is that one or both of the relatively rotatable members 10 and 11 be relatively alignable with respect to the other so that a parallel relationship between the members is determined geometrically by the opposing plane surfaces 30 and 31 and by intervening balls 12 without disturbance by other mechanical constraints. Those skilled in the mechanical art will readily perceive other structures for providing the required alignability.

What is claimed as new is:

1. A magnetic recording apparatus comprising: first and second relatively rotatable members each having a plane surface, a plurality of equidiametered spherical balls positioned between said plane surfaces, means for loading one of said members toward the other of said members to compress said balls between said plane surfaces to thereby constrain said plane surfaces to parallel alignment at a spacing equal to the common diameter of said balls, a magnetizable record channel established upon a portion of the plane surface of said first member, and a magnetic transducer affixed to said second member and positioned contiguous to said record channel.

2. A magnetic recording apparatus comprising: a stator member having a first plane surface and a rotatable rotor member having a second plane surface, said rotor member being positioned adjacent said stator member and being freely alignable in its plane of rotation; a plurality of equidiametered spherical balls revolvably positioned between said plane surfaces of said rotor and stator members; means for resiliently loading said rotor member towards said stator member to compress said balls between said plane surfaces to thereby align said rotor member so that said second plane surface is parallel to said first plane surface and spaced therefrom at a distance equal to the common diameter of said balls; a magnetizable record channel established upon a portion of the plane surface of one of said members; a magnetic transducer affixed to the other of said members contiguous to said record channel; and means for rotating said rotor member with respect to said stator member.

3. A self-balancing magnetic recording apparatus comprising: a stator member having a first plane surface; a shaft fixedly positioned with respect to said stator member and rotatable with respect to said stator member, said shaft having a predetermined axis of rotation; a rotor member having a second plane surface and positioned over said shaft, said rotor member being angularly alignable and radially slidable with respect to said axis of rotation; a plurality of equidiametered spherical balls revolvably positioned between said plane surfaces; a resilient preload coupling element, connected to said shaft and frictionally engaging said rotor member, for resiliently loading said rotor member toward said stator member to compress said balls between said plane surfaces and thereby angularly align said second plane surface parallel to said first plane surface at a spacing equal to the common diameter of said balls; a magnetizable record channel established upon one of said members; a magnetic transducer affixed to the other of said members and positioned contiguous to said channel; and means for rapidly rotating said shaft relative to said stator whereby said rotor member is frictionally compelled to rotate with said shaft and tends to slide in its plane of rotation until its center of gravity substantially coincides with said axis of rotation of said shaft.

4. A magnetic recording apparatus comprising: a preloaded thrust bearing having first and second spacedly positioned relatively rotatable sections each having a race surface, said first race surface having a magnetizable record channel established thereon, and a magnetic transducer fixedly positioned relative to said second section and having an active portion contiguous to said magnetizable record channel on said race surface.

5. The magnetic recording apparatus defined by claim 4 wherein said thrust bearing includes a plurality of equidiametered spherical balls revolvably positioned between said first and second sections, each of said balls being in contact with said race surfaces.

6. The magnetic recording apparatus defined by claim 5 wherein said first and second sections each have a plane race surface, and wherein said preloaded thrust bearing includes apparatus for positioning said balls between and in contact with each of said plane race surfaces, the plane race surface of said first section being spaced from and parallel to the plane race surface of said second section.

7. The magnetic recording apparatus defined by claim 6 wherein a portion of the plane surface of said first section is coated with ferromagnetic material, the coating of ferromagnetic material comprising said magnetizable record channel.

8. A magnetic recording apparatus comprising: a stator having a first plane surface; a rotor having a second plane surface, a portion of said second plane surface being magnetizable, said rotor being positioned adjacent said stator with said second plane surface of said rotor being parallel to and spaced from said first plane surface of said stator; a plurality of equidiametered spherical balls revolvably positioned between said rotor and said stator, each ball being in contact with said first and second plane surfaces, a magnetic transducer coupled to said stator and having an active portion contiguous said magnetizable portion of said rotor; and means for rotating said rotor with respect to said stator.

9. The magnetic recording apparatus defined by claim 8 which further comprises means for applying force to said rotor directed toward said stator to tend to preload said balls between said first and second plane surfaces, whereby said second plane surface of said rotor is positioned parallel to said first plane surface of said stator at a fixed spacing therefrom equal to the diameter of said balls.

References Cited in the file of this patent

UNITED STATES PATENTS

| | | |
|---|---|---|
| 765,462 | Dennison | July 19, 1904 |
| 2,521,476 | Owens | Sept. 5, 1950 |
| 2,537,657 | D'Humy | Jan. 9, 1951 |